United States Patent
Bender et al.

(10) Patent No.: US 10,311,304 B2
(45) Date of Patent: Jun. 4, 2019

(54) MOBILE DEVICE ACCIDENT AVOIDANCE SYSTEM

(71) Applicant: International Business Machines Corporation, Armonk, NY (US)

(72) Inventors: Michael Bender, Rye Brook, NY (US); Santosh S. Borse, Ossining, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/426,121

(22) Filed: Feb. 7, 2017

(65) Prior Publication Data
US 2018/0225513 A1    Aug. 9, 2018

(51) Int. Cl.
*H04N 5/222*    (2006.01)
*G06K 9/00*    (2006.01)
(Continued)

(52) U.S. Cl.
CPC .......... *G06K 9/00671* (2013.01); *G01S 19/13* (2013.01); *G06F 3/017* (2013.01);
(Continued)

(58) Field of Classification Search
CPC ............... H04N 5/23251; H04N 5/144; H04N 5/23254; H04N 5/23258; H04N 5/23293; H04N 1/00408; G03B 13/00; G03B 13/04
See application file for complete search history.

(56) References Cited

U.S. PATENT DOCUMENTS

| 8,787,944 B2 | 7/2014 | Smith |
| 8,953,841 B1 | 2/2015 | Leblang et al. |

(Continued)

FOREIGN PATENT DOCUMENTS

CN     201095337 Y    8/2008

OTHER PUBLICATIONS

Arif, Ahmed Sabbir et al.; "Extending Mobile User Ambient Awareness for Nomadic Text Entry"; OZCHI 2011 Proceedings ISBN: 978-1-4503-1090-1; Nov. 28-Dec. 2, 2010; Canberra, Australia; Copyright: the author(s) and CHISIG; pp. 10.

(Continued)

*Primary Examiner* — Kelly L Jerabek
(74) *Attorney, Agent, or Firm* — Brian M. Restauro; Hoffman Warnick LLC

(57) ABSTRACT

A system, method and program product for providing accident avoidance for a mobile device having a camera integrated therein. A system is disclosed that includes: a camera orientation device that is mountable on a mobile device and includes a mechanism to reorient a line of sight of the camera in response to detected position information of the mobile device; and an image feed manager adapted to run on the mobile device, wherein the image feed manager includes: an orientation system that detects position information of the mobile device and communicates the position information to the camera orientation device; an image analysis system that analyzes an image feed from the camera to identify hazards; an overlay system that displays the image feed onto a display area of the mobile device; and a warning system that issues an alert in response to an identified hazard.

18 Claims, 5 Drawing Sheets

(51) Int. Cl.

| | |
|---|---|
| *H04N 5/232* | (2006.01) |
| *G06F 3/01* | (2006.01) |
| *G08B 21/02* | (2006.01) |
| *G01S 19/13* | (2010.01) |
| *G08B 5/36* | (2006.01) |
| *G08B 21/24* | (2006.01) |
| *G08B 25/01* | (2006.01) |

(52) U.S. Cl.
CPC ........... *G06K 9/00664* (2013.01); *G08B 5/36* (2013.01); *G08B 21/02* (2013.01); *G08B 21/24* (2013.01); *G08B 25/016* (2013.01); *H04N 5/23293* (2013.01); *G06K 9/00805* (2013.01)

(56) References Cited

U.S. PATENT DOCUMENTS

| | | | |
|---|---|---|---|
| 9,420,559 B2 | 8/2016 | Bai et al. | |
| 2011/0081946 A1 | 4/2011 | Singh | |
| 2013/0293586 A1 | 11/2013 | Kaino et al. | |
| 2014/0078389 A1* | 3/2014 | Merz | H04N 5/2252 348/375 |
| 2014/0085334 A1 | 3/2014 | Payne | |
| 2014/0180582 A1* | 6/2014 | Pontarelli | G01C 21/20 701/494 |
| 2014/0228073 A1 | 8/2014 | Fratti et al. | |
| 2014/0357213 A1* | 12/2014 | Tanaka | H04W 4/22 455/404.1 |
| 2015/0062416 A1* | 3/2015 | Vance | G03B 17/17 348/369 |
| 2015/0109475 A1* | 4/2015 | Matilainen | H04M 1/0264 348/222.1 |
| 2015/0123992 A1 | 5/2015 | Mahan et al. | |
| 2015/0189158 A1 | 7/2015 | Hailey | |
| 2015/0281530 A1* | 10/2015 | Kessler | G03B 17/565 348/373 |
| 2015/0288798 A1* | 10/2015 | Wightman | H04M 1/72552 455/566 |
| 2017/0235986 A1* | 8/2017 | Kowalczyk | G06K 7/146 235/462.21 |

OTHER PUBLICATIONS

Metz, Rachel; "Safe Texting While Walking? Soon, There May Be an App for That"; CrashAlert, created by University of Manitoba researchers, could make it easier to walk and text without smacking into things; Apr. 15, 2013; pp. 8; Printed Feb. 6, 2017; <https://www.technologyreview.com/s/513401/safe-texting-while-walking-soon-there-may-be-an-app-for-that/>.

Presselite; "Type while you walk Free on the App Store"; iTunes Preview; Copyright 2016 Apple Inc.; pp. 3; Printed Feb. 6, 2017; <https://itunes.apple.com/us/app/type-while-you-walk-free/id378923576?mt=8>.

Wei, Zhuo et al.; "Automatic Accident Detection and Alarm System"; MM; 15; Oct. 26-30, 2015; Copyright 2015; ACM. ISBN 978-1-4503-3459-04/15/10; pp. 781-784.

Wen, Jiaqi et al.; "We Help You Watch Your Steps: Unobtrusive Alertness System for Pedestrian Mobile Phone Users"; 2015 IEEE International Conference on Pervasive Computing and Communications (PerCom); pp. 105-113.

Hincapie-Ramos, Juan David et al.; "CrashAlert: Enhancing peripheral alertness for eyes-busy mobile interaction while walking"; ResearchGate; Conference Paper Jan. 2013; Retrieved on: Sep. 27, 2016; CHI 2013; Apr. 27-May 2, 2013; Copyright 2013; ACM 978-1-4503-1899-01/13/04; pp. 5.

* cited by examiner

MOBILE DEVICE ACCIDENT AVOIDANCE SYSTEM

TECHNICAL FIELD

The subject matter of this invention relates mobile devices, and more particularly to a system and method of protecting users moving about with a mobile device.

BACKGROUND

As engagement with mobile devices (including hand-held devices, wearable devices, etc.) becomes more prolific, users are becoming more and more distracted and unaware of their surroundings. For example, it is not uncommon for users to walk while staring down at their smartphone, e.g., to view text and emails, engage with social media, play games, etc.

Unfortunately, such behaviors are not without peril. Users distracted by their devices can easily walk into objects, walk into dangerous areas such as busy streets, fail to see objects moving towards them, get lost, etc. As mobile devices (including wearable devices such as smart watches, smart clothing, etc.) continue to be used during everyday activities, such as walking, working, exercising, etc., an increased number of accidents are occurring.

SUMMARY

Aspects of the disclosure provide an accident avoidance system for mobile devices.

A first aspect discloses an accident avoidance system for a mobile device having a camera integrated therein, including: a camera orientation device that is mountable on a mobile device and includes a mechanism to reorient a line of sight of the camera in response to detected position information of the mobile device; and an image feed manager adapted to run on the mobile device, wherein the image feed manager includes: an orientation system that detects position information of the mobile device and communicates the position information to the camera orientation device; an image analysis system that analyzes an image feed from the camera to identify hazards; an overlay system that displays the image feed onto a display area of the mobile device; and a warning system that issues an alert in response to an identified hazard.

A second aspect discloses a computer program product stored on a computer readable storage medium, which when executed by a computing system, provides accident avoidance for a mobile device, the program product including: program code that detects position information of a mobile device and communicates the position information to an externally affixed camera orientation device to reorient a line sight of a camera; program code that analyzes an image feed from the camera to identify hazards; program code that displays the image feed onto a display area of the mobile device; and program code that issue an alerts in response to an identified hazard.

A third aspect discloses an accident avoidance method for a mobile device having a camera integrated therein, including: detecting position information of a mobile device; communicating the position information to a camera orientation device affixed to the mobile device to reorient a line of sight of the camera; analyzing an image feed from the camera to identify hazards; displaying the image feed onto a display area of the mobile device; and issuing an alert in response to an identified hazard.

BRIEF DESCRIPTION OF THE DRAWINGS

These and other features of this invention will be more readily understood from the following detailed description of the various aspects of the invention taken in conjunction with the accompanying drawings in which.

Figure 1:
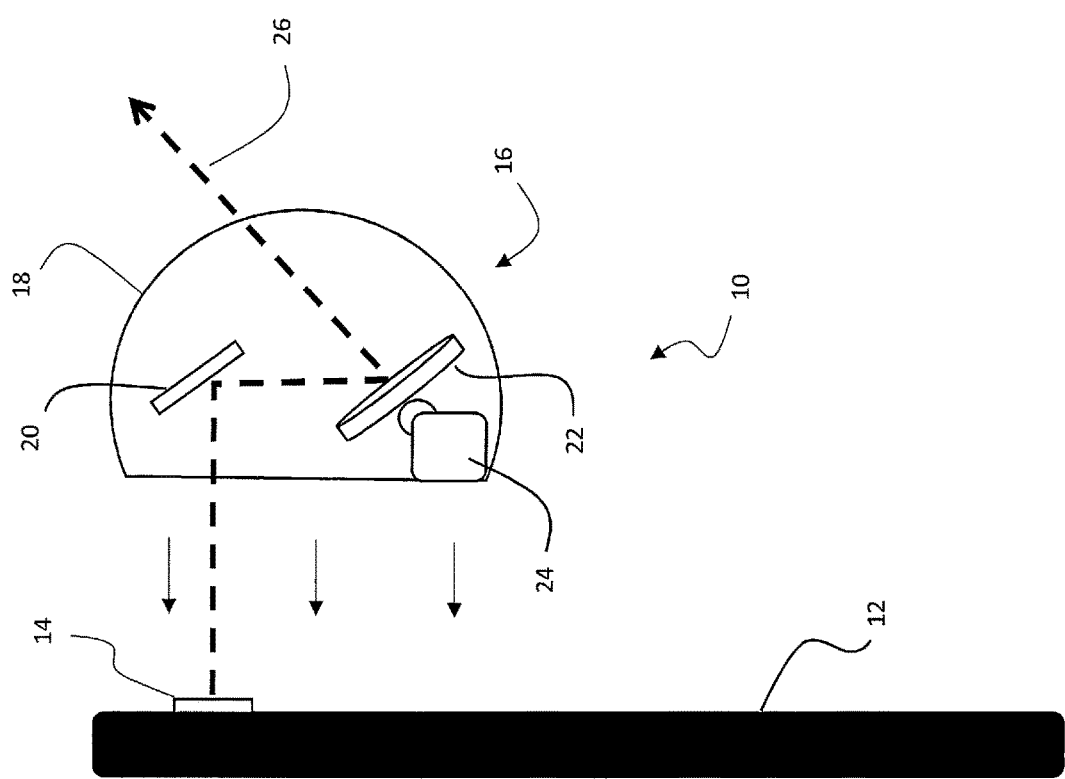
FIG. 1 shows an accident avoidance system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts an accident avoidance system 10 that continuously and automatically reorients the line of sight of an integrated mobile device camera to, e.g., be generally parallel with the ground in a direction of travel, thus providing a user with visual information of what is in front of them when the user is looking down at their mobile device 12. Accident avoidance system 10 generally includes: (1) a mobile device 12 running an image feed manager 58 (described in detail in FIG. 4), which is equipped with an integrated camera; and (2) an affixed (attachable or permanent) camera orientation device 16.

As shown, camera orientation device 16 can be affixed over the camera lens 14 (as shown by arrows) and includes a control mechanism 24 for reorienting the line of sight 26 of the camera. In the depicted illustrative embodiment, camera orientation device 16 includes a fixed mirror 20 and a movable mirror 22 enclosed in a transparent shell 18. However, it is understood that device 16 could be implemented with a single mirror, multiple mirrors, prisms, lenses, or any other optic technology that allows for line of sight reorientation.

Camera orientation device 16 further include a control mechanism 24 that allows the movable mirror 22 to be re-positioned in three dimensions to achieve a desired line of sight 26. In one illustrative embodiment, control mechanism 24 may include a gyroscope or similar technology to control orientation of the movable mirror 22. In another embodiment, sensors or other features provided by mobile device 12 can be communicated to control mechanism 24 to control the orientation of the movable mirror 22. Communication between the mobile device 12 and the control mechanism 24 may be achieved using wireless communications (e.g., Bluetooth), or hardwired communicated (e.g., by plugging into a port on the mobile device 12). Similarly, the control mechanism 24 may be powered in any manner, e.g., internally with a battery, wirelessly, or externally via a port on the mobile device 12. Further, camera orientation device 16 may be attached to the mobile device in any matter, e.g., via an integrated case, magnets, spring-loaded clips, etc., or be permanently integrated with the mobile device 12.

Figure 2:
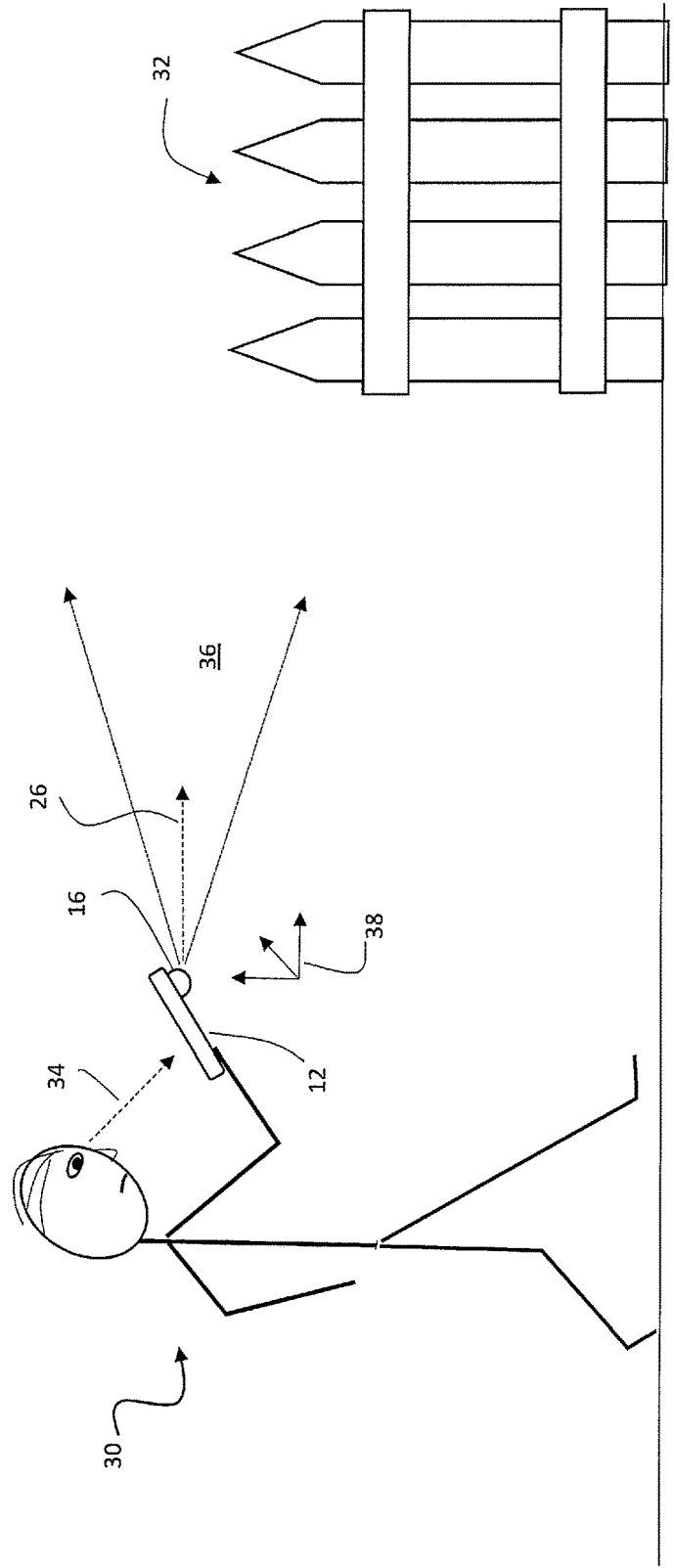
FIG. 2 shows a user engaged with a mobile device having an accident avoidance system according to embodiments.

FIG. 2 depicts an illustrative use case for a user 30 looking downward 34 at a mobile device 12 while walking towards a hazard (e.g., an obstruction, impediment, etc.) 32. As shown, camera orientation device 16 automatically and continuously reorients the camera line of sight 26 parallel to the ground in the direction of travel. A field of view 36 of the area directly in front of the user 30 can thus be analyzed by and/or displayed on the mobile device 12. Regardless of how the mobile device 12 is positioned, i.e., moved, tilted, etc., within a three dimensional space 38, the line of sight 36 remains parallel to the ground in the direction of travel. Note that while this use case maintains the line of sight 26 parallel to the ground, the implementation direction for the line of sight 26 may vary depending on the application, e.g., the line of sight 26 may be oriented at some other angle, e.g., five degree above parallel, may change based on the environment or surroundings, may be based on user preferences, etc.

Figure 3:
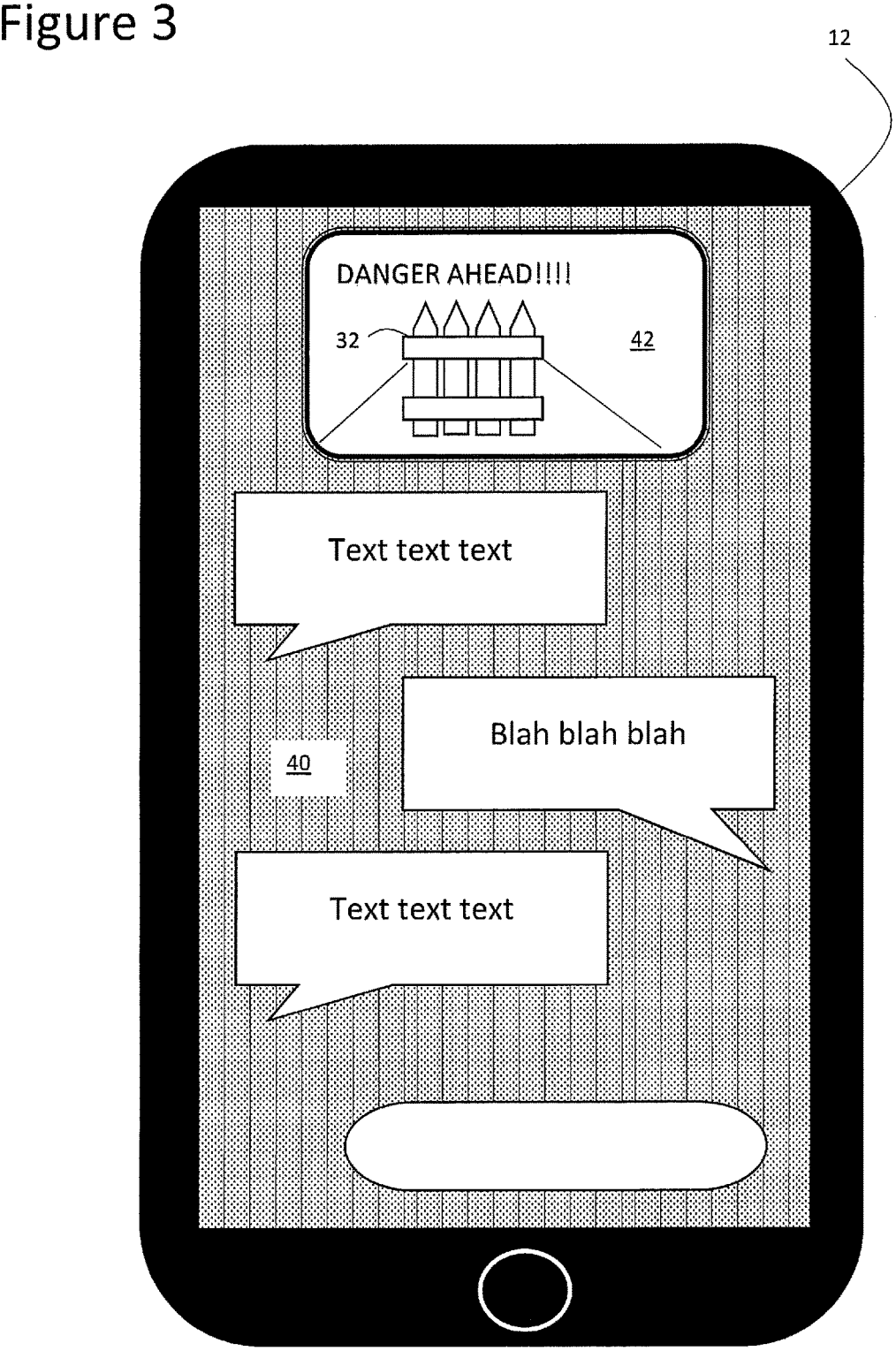
FIG. 3 shows an illustrative user interface on a mobile device according to embodiments.

FIG. 3 depicts an illustrative display on a mobile device 12 that provides an overlay window 42 displaying a live feed from the reoriented camera. In this example, the mobile device 12 is running a text messaging application 40. The overlay window 42 is placed within the display and shows the user 30 (FIG. 2) image data of what is directly in front of the user 30. In this example, the hazard 32 is shown, thus alerting the user 30 of a potentially dangerous situation. In addition, a textual warning is shown "DANGER AHEAD!!!!" to further alert the user 30. Dangerous situations may for example be determined by analyzing image data using known image processing techniques. It is understood that the depicted display and overlay window 42 in FIG. 3 is one potential embodiment, and is not intended to be limiting. For example, the overlay window 42 may be placed elsewhere within the display, may only appear when a potentially hazardous situation is detected, may be integrated into an app, etc.

Additionally, an object or hazard in the user's path may be displayed with highlighting and/or a digital transformation to make the user better understand the warning. For example, an object may be shrunk or enlarged, or a part of the image depicting the hazard may be sliced and/or diced. Further, the image may be replaced with a standard or predefined image (e.g., an emoji of a fire hydrant). In other cases, an emoji and/or text may be overlaid on the image, or the image may be shown with a change in the color, etc.

The system may also highlight potentially hazardous objects with color codes (in addition to above digital transformation) or by adding a flashing image. For example, the color red may be added to an object or to a window border, or to a blinking portion of the image data.

Figure 4:
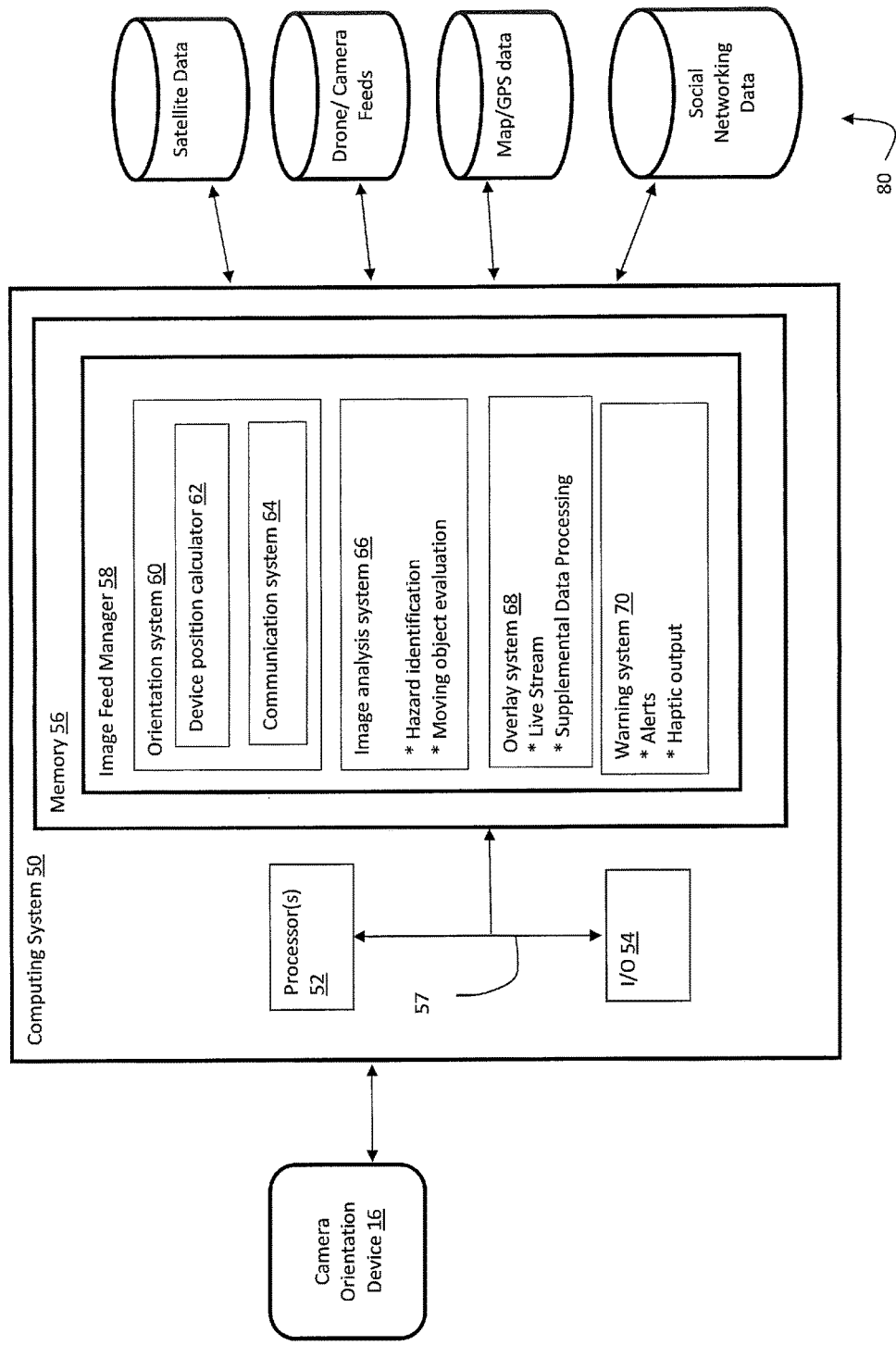
FIG. 4 shows a computing system having an accident avoidance system according to embodiments.

FIG. 4 depicts a computing system 50 incorporated into or accessible by a mobile device 12 that includes an image feed manager 58 for managing image data collected via the camera orientation device 16. Image feed manager 58 optionally includes an orientation system 60 that has device position calculator 62 for determining the position of the mobile device 12 (e.g., amount forward tilt, roll, pitch, yaw, etc. relative to a predetermined position) and a communication system 64 for communicating the position information to the camera orientation device 16. Position information of the mobile device 12 also includes direction of travel information, which may be determined by analyzing GPS data from the device 12. Based on the position information, the camera orientation device 16 can adjust the line of sight to a desired direction (e.g., parallel to the ground in the direction of travel). In an alternative embodiment, the position calculation can be done within the camera orientation device 16 itself, e.g., with a gyroscope and microprocessor, or the like.

Image analysis system 66 analyzes the image data collected by the reoriented camera to, e.g., identify hazards in the user's path of travel, evaluate moving objects to determine if they present a hazard, rate the overall danger level of the area being traversed, etc. Image analysis system 66 may for example use 2D or 3D object recognition, image segmentation, motion detection, video tracking, etc., using known digital image processing techniques. Hazard information may include specific object detection information (e.g., a fire hydrant, a fence, a puddle, etc.) and/or generic information (e.g., a large object, a moving object, a red object, etc.). Hazard information may also include location data (e.g., object x is six feet in front of you).

Overlay system 68 provides a hook into the display system of the mobile device 12 to display image data and/or supplemental information 80. Image data may for example include a live feed captured from the reoriented camera, as well as hazard information determined by the image analysis system 66. For example, the image data may be augmented to highlight hazards 32, color code the overall danger level, provide distance information, etc. Supplemental information 80 may include information collected from third party sources, such as satellite data, drone and other camera feeds, map and GPS data, social network data, etc. Thus for example, a camera feed from a drone or satellite or other user might be intermittently displayed (or displayed in a split screen) to give the user notification of a problem a few blocks ahead, map/GPS data may be used to specifically pinpoint hazards, social network data may be collected, shared and displayed (e.g., "watch out for that big puddle on the corner of $12^{th}$ and $1^{st}$ Street!").

Warning system 70 utilizes the image analysis results to evaluate specific hazards, and issue alerts. Alerts may comprise visual alters (e.g., highlighted objects, text warnings, blinking or color coded signals, etc.), audio alters (e.g., rings, beeps, natural language generation, etc.) and haptic outputs (e.g., vibrations, etc.). Alerts may be escalated as the user gets closer and closer to a hazard.

The accident avoidance system 10 (FIG. 1) thus provides the ability to use camera input from a fixed lens on a mobile device 12 regardless of the position a user is carrying the device. In addition, accident avoidance system 10 allows for supplementing the image feed with GPS data or images from other camera inputs for a more enhanced risk avoidance platform. The image feed can be integrated with existing apps and screen content so that the user of the device can remain engaged with the device. The image feed may be implemented so as to be minimally intrusive when no danger exists (e.g., in a lighter contrast, as a thumbnail, etc.), and then become more intrusive when danger is detected. The accident avoidance system 10 can track objects in motion within the field of vision and calculate whether objects are on a path to intersect the user based on the direction of travel. A calculation of risk may be further determined based on the amount of the image that is within the field of vision or based on calculated distance. The accident avoidance system 10 may also store known fixed objects from a GPS database that supplement the image feed for objects not visible to the camera. Additional video images can be provided and displayed by linked external cameras in a social networking or other setting.

Figure 5:
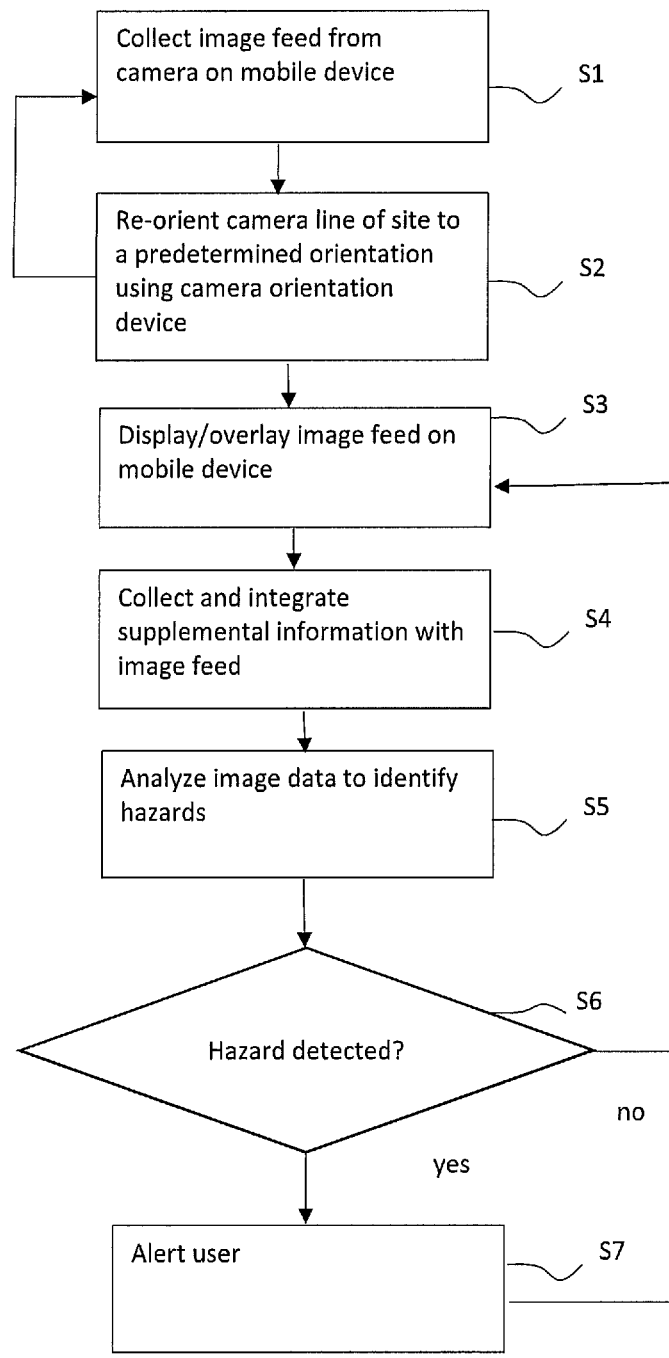
FIG. 5 depicts a flow diagram of a method of implement a mobile device having an accident avoidance system according to embodiments.

FIG. 5 depicts a flow diagram showing a method of implementing accident avoidance system 10. At S1, an image feed is collected from the camera on a mobile device and at S2 the camera line of sight is reoriented to a predetermined orientation (e.g., parallel to the ground in the direction of travel) using camera orientation device 16 (FIG. 1). S1 and S2 is a repeated process that continuously and automatically accounts for changes in the position of the mobile device 12 held by the user. At S3, the image feed is displayed, e.g., as an overlaid image on the mobile device 12.

At S4, supplemental information (e.g., other camera feeds, map information, social media data, etc.) is collected and integrated with the image feed. At S5 the image data (including the supplemental information) is analyzed to identify hazards and at S6 a determination is made whether a hazard has been detected. If yes, the user is alerted and the process returns to S3. If no, the process likewise returns to S3.

It is understood that image processing system 58 (FIG. 4) may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 50 that may comprise any type of computing device and for example includes at least one processor 52, memory 56, an input/output (I/O) 54 (e.g., one or more I/O interfaces and/or devices), and a communications pathway 57. In general, processor(s) 52 execute program code which is at least partially fixed in memory 56. While executing program code, processor(s) 52 can process data, which can result in reading and/or writing transformed data from/to memory and/or I/O 54 for further processing. The pathway 57 provides a communications link between each of the components in computing system 50. I/O 54 can comprise one or more human I/O devices, which enable a user to interact with computing system 50. Computing system 50 may also be implemented in a distributed manner such that different components reside in different physical locations.

Furthermore, it is understood that the image processing system 58 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. An accident avoidance system for a mobile device having a camera, comprising:
    a camera orientation device that is mountable on a mobile device and includes a mechanism to reorient a line of sight of the camera in response to detected position information of the mobile device, wherein the camera orientation device includes at least one movable mirror that can be oriented by a control mechanism in three dimensions and wherein the line of sight of the camera is continuously reoriented substantially parallel to ground in a direction of travel; and
    an image feed manager adapted to run on the mobile device, wherein the image feed manager includes:
        an orientation system that detects position information of the mobile device and communicates the position information to the camera orientation device;
        an image analysis system that analyzes an image feed from the camera to identify hazards;
        an overlay system that displays the image feed onto a display area of the mobile device; and
        a warning system that issues an alert in response to an identified hazard.

2. The accident avoidance system of claim 1, wherein the camera orientation device is integrated into a case adapted to fit onto the mobile device.

3. The accident avoidance system of claim 1, wherein the orientation system detects position information from a gyroscope and direction of travel information from a global positioning system (GPS).

4. The accident avoidance system of claim 1, wherein the overlay system further displays supplemental information that includes at least one of satellite image data, drone image feeds, third party camera feeds, map data, or social network data.

5. The accident avoidance system of claim 1, wherein the image analysis system uses object recognition to identify hazards.

6. The accident avoidance system of claim 5, where in the image analysis system further includes a motion detection system that detects moving objects and determines if a moving object will intersect with a user of the mobile device.

7. A computer program product stored on a non-transitory computer readable storage medium, which when executed by a computing system, provides accident avoidance for a mobile device, the program product comprising:
    program code that detects position information of a mobile device and communicates the position information to an externally affixed camera orientation device to reorient a line sight of a camera, wherein the camera orientation device includes at least one movable mirror that can be oriented by a control mechanism in three dimensions, and wherein the position information causes the line of sight of the camera to be reoriented substantially parallel to ground in a direction of travel;
    program code that analyzes an image feed from the camera to identify hazards;
    program code that displays the image feed onto a display area of the mobile device, wherein the image feed is displayed along with an active user application; and
    program code that issues an alert in response to an identified hazard.

8. The program product of claim 7, wherein the camera orientation device is integrated into a case adapted to fit onto the mobile device.

9. The program product of claim 7, wherein the position information is determined from a gyroscope and a direction of travel information is determined from a GPS.

10. The program product of claim 7, further comprising program code that displays supplemental information that includes at least one of satellite image data, drone image feeds, third party camera feeds, map data, or social network data.

11. The program product of claim 7, wherein hazards are identified using object recognition.

12. The program product of claim 11, where hazards are further identified using motion detection.

13. An accident avoidance method for a mobile device having a camera, comprising:
    detecting position information of a mobile device;
    communicating the position information to a camera orientation device affixed to the mobile device to reorient a line of sight of the camera;
    analyzing an image feed from the camera to identify hazards;

displaying a text messaging application on a display of the mobile device;

displaying the image feed in an overlay window along with the text messaging application on the display only when a hazard is identified; and issuing an alert in response to an identified hazard.

14. The method of claim 13, wherein the line of sight of the camera is continuously reoriented substantially parallel to ground in a direction of travel.

15. The method of claim 14, wherein the position information is detected from a gyroscope and the direction of travel information is determined from a GPS.

16. The method of claim 15, wherein hazards are further identified using motion detection.

17. The method of claim 14, further comprising displaying supplemental information that includes at least one of satellite image data, drone image feeds, third party camera feeds, map data, or social network data.

18. The method of claim 14, wherein hazards are identified using object recognition.

* * * * *